Patented May 2, 1950

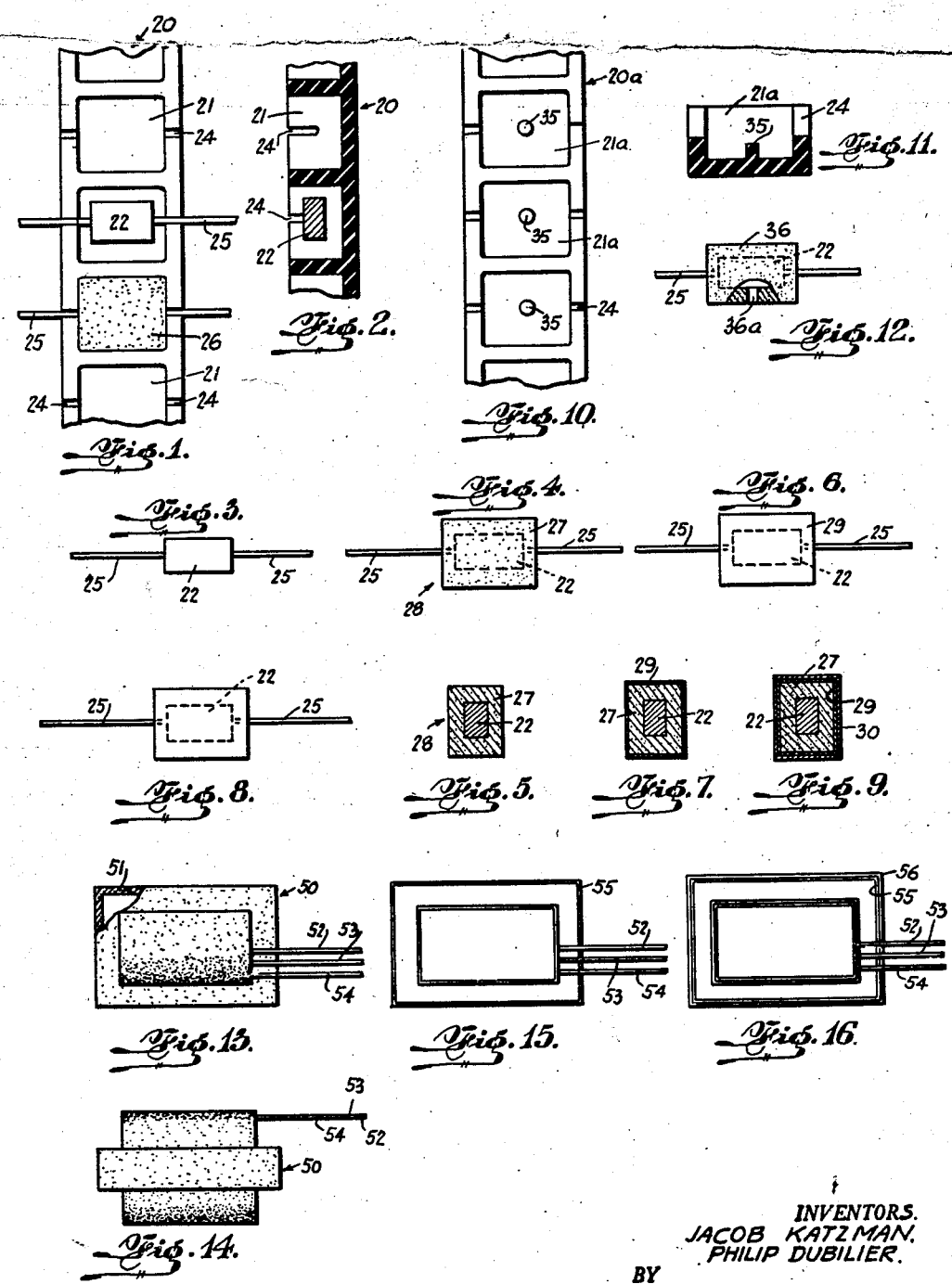

2,506,446

UNITED STATES PATENT OFFICE 2,506,446

ELECTRICAL CONDENSER

Philip Dubilier and Jacob Katzman,
New York, N. Y.

Application November 13, 1944, Serial No. 563,121

2 Claims. (Cl. 174—17)

This invention relates generally to improvements in electrical devices or units, and has particular application to electrical units, such as, condensers, transformers, etc., of the molded type.

It is an object of the present invention to provide an electrical device of the molded type in which the cover or case is made of a composition containing a chemically setting or thermosetting material or a combination of both.

It is a further object of the present invention to provide an electrical condenser structure which is more efficient than the prior type of condenser embodying foil and dielectric layers; and which may be economically manufactured in quantity.

A still further object of the present invention is to completely encase an electrical section or unit in a calcined gypsum composition and to subsequently treat the encasement and section to make the same heat-resistant and moisture-proof.

The invention has application to electrical units in general, but will be described, by way of example, with reference to condensers and transformers.

A form of condenser section employable in the invention comprises alternate strips of conducting and dielectric materials, such as, foil and paper, the foil and paper being rolled or wound into a compact mass or unit, this unit being either left in its cylindrical shape, or pressed into a flat or other desirable shape.

These condenser sections are impregnated with waxes of different kinds, the wax being selected according to the ultimate desired characteristics. For example, "Halowax" is used to give high capacity per unit volume; paraffin wax is used to give better leakage resistance and moisture proofing; other condenser sections are impregnated in oil. These impregnated condenser sections were customarily placed in paper tubes, the latter being made moisture proof by impregnation with wax. Wax, of course, melts at a definite temperature (depending upon the wax used), and whenever that temperature is reached, the wax melts and fails to seal the paper tube, resulting in the deterioration of the enclosed condenser section.

Some condenser sections, in order to protect them from the elements, are housed in metal tubes, but these metal tubes require costly insulation between the condenser section and the metal tube, and between the electrical terminals and the tube. Again, at high frequencies, the introduction of the metal in the electrical field of the circuit often causes excessive losses in the circuit. Sometimes, too, these metal tubes or housings, by accidentally coming in contact with exposed wires of the circuit, would cause shorts. At high altitudes, where the atmospheric pressure is low, current would jump from a terminal of the condenser unit to the metal shell forming the tube.

Another form of condenser heretofore employed had a molded cover or case in which the condenser section disposed therein was made from alternate sheets of metal foil and paper impregnated with a solid dielectric, such as, wax. This assembly was placed in a mold between sheets of a suitable molding composition including phenolic condensation product and subject to heat and pressure, thus integrally uniting the plastic sheets together with the condenser section. The cover formed by the plastic sheets could not be hardened, because, if too much heat was applied it would reach the condenser section and melt the wax dielectric, changing the capacity of the condenser.

It is, therefore, another object of the present invention to provide a molded condenser which will avoid the heretofore mentioned disadvantages and defects.

In carrying out the above objects, the electrical section is molded in a porous, cold, chemically-setting material, such as, calcium sulphate, otherwise known as calcined gypsum or plaster of Paris, which is porous and capable of absorption; or a composition containing sodium silicate, aluminum oxide, aluminum sulphate and a filler, such as, white sand these self-setting materials becoming or setting hard within a period of substantially six hours. The molded unit in which is enclosed the electrical section is impregnated wtih a thermosetting or cold drying varnish, lacquer or like material, after, however, the occluded moisture has been driven off by suitable means. This seals the entire molded unit.

Another chemically setting composition which may be employed comprises sodium silicate, aluminum oxide, aluminum sulphate and a filler, such as, white sand. The powdered or comminuted sand, aluminum oxide and aluminum sulphate is mixed together in preferably the proportion of sand about 80%, aluminum oxide about 10%, and aluminum sulphate about 10%. Sufficient sodium silicate liquid is then mixed with the aforesaid powder mixture until a creamy consistency is obtained. The sand, aluminum oxide and aluminum sulphate mixture reacts with the sodium silicate to produce a gelatinous hydroxide cement. The composition sets in about three-quarters of an hour, into a very hard solid substance. In order to prevent chemical reaction between the cement and the foil of the condenser section, it is preferable to insert a barrier washer made of any suitable insulating material, such as, ceramic, impregnated fiber, Bakelite, etc.

As examples of thermosetting materials may be mentioned resinous condensation products, and more particularly phenol condensation products or phenol formaldehyde resins. Ureaformaldehyde resins and melamine resins and compounds may also be employed, particularly the latter, since these have high dielectric strength, are highly heat-resistant, are resistant to organic solvents, alkalies and weak acids. Another thermosetting material which may be employed is aniline-formaldehyde resin, which has excellent dielectric properties, weather resistance and moisture and chemical resistance.

It is, therefore, a still further object of the present invention to provide an electrical unit which will avoid the heretofore mentioned disadvantages and defects, and which is highly heat resistant, moisture resistant, has high dielectric strength and other properties, and chemical resistance.

It is evident that other electrical units, such as, for example, transformers may be cold molded in a casing of self-setting material and then coated or impregnated with a heat resistant, moisture proof lacquer or varnish. This cold molded material shrinks around the enclosed elements and electrical terminals.

Further objects and advantages of the invention will appear from the following disclosure thereof together with the attached drawing which illustrates a certain form of embodiment thereof. This form is shown for the purpose of illustrating the invention since the same has been found in practice to give satisfactory and reliable results.

In the drawings:

Fig. 1 illustrates a plan view of a flexible mold showing disposed therein a condenser unit or section of fixed capacity before it is being molded into the casing, and a complete condenser in molded form;

Fig. 2 is a sectional view taken on line 2—2 of Fig. 1;

Fig. 3 is a side elevational view of a condenser section before the surrounding casing is formed;

Fig. 4 is a view the condenser unit having applied thereto the molded casing;

Fig. 5 is a sectional view taken on line 5—5 of Fig. 4;

Fig. 6 is a view of the molded condenser with a heat and moisture resistant impregnation or coating;

Fig. 7 is a sectional view taken along line 7—7 of Fig. 6;

Fig. 8 is a view of the molded condenser shown in Fig. 4 having a varnish and wax insulating impregnation;

Fig. 9 is a sectional view taken along line 9—9 of Fig. 8;

Fig. 10 is a plan view of a flexible mold employable in the manufacture of molded condensers embodying the invention in a somewhat modified form from that produced by the mold shown in Fig. 1;

Fig. 11 is a sectional view taken along line 11—11 of Fig. 10;

Fig. 12 is a plan view of a molded condenser (partly broken away) produced in the mold shown in Fig. 11;

Fig. 13 is a top plan view (partly broken away) of an encased transformer made in accordance with the invention;

Fig. 14 is a front elevational view of Fig. 13;

Fig. 15 is a top plan view similar to Fig. 13, after application of the first impregnation; and Fig. 16 is a top plan view similar to Fig. 13, after application of the second impregnation.

Referring now more particularly to the drawings (Figs. 1–12), there is seen a portion of a flexible mold 20 having a plurality of cavities 21 in which are inserted the condenser inserts or sections 22 to be molded. The opposite walls 23 of cavity 21 are provided with grooves or channels 24 for receiving the condenser terminals 25. This mold is conventional and may be made of rubber, composition containing rubber or any flexible material employable as substitutes for rubber.

The cold chemically-setting material, such as, calcined gypsum or plaster of Paris and water mixture is poured into the cavity of the mold containing the condenser insert or section, the mixture shrinking around the elements and terminals of the condenser section and forming a self-setting body 26 thereabout, as clearly seen in Fig. 1. When this plaster of Paris mixture has set it provides a porous casing or enclosure 27 intimately united to the condenser section as seen in Figs. 4 and 5. Because of the fact that no heat is applied during the molding operation, the paper and foil elements comprising the condenser section are not deleteriously affected. The condenser section is completely embedded in a body of molded insulating material with its terminals 25 projecting beyond the molded body 27. Instead of employing plaster of Paris, it is possible to use any suitable cold-setting cement or other material, preferably which is porous.

The condenser body or section may or may not be impregnated or otherwise treated with a dielectric or moisture-proof material prior to its being molded, but should be first dried in a suitable drying oven. Since the molded casing is porous the air and moisture may be easily occluded from the molded condenser by the application of heat and vacuum for a predetermined length of time. The molded condenser may now be impregnated if desired with a molten or a liquid dielectric, such as, an insulating oil.

The chemically-setting material which comprises the molded shell or housing 27, being porous will absorb a thermosetting or cold drying varnish or lacquer. The occluded moisture in the molded condenser unit 28 is driven off by suitable means and then this unit 28 is impregnated with a suitable insulating varnish or lacquer 29 which fills up all the voids in the paper dielectrics as well as the voids in the porous casing, thus preventing the re-entrance of moisture or gases; condenser unit 29 is thus wholly sealed, and the section 22 therein so tightly encased in the molded housing without the possibility of moisture having an opportunity of affecting it.

If the molded condenser is impregnated with a thermosetting varnish or lacquer 29, then, it is baked for a period sufficiently long to set the varnish or lacquer permanently, the length of time depending upon the baking temperature required for the particular type varnish used. When the temperature is lowered the length of time of baking is increased to accomplish the set of the thermosetting varnish or lacquer. Where a more thorough moisture proofing is desired, these molded condensers may be reimpregnated in the thermosetting varnish, giving to the same several coatings of the varnish, as required. But before each impregnation, the previous coating of varnish has to be set by heating, even though complete set may not be required until the final coating has been applied.

It has been found that even after two or three such varnish treatments, there may still be a microscopic opening in the housing or casing of the condenser. Therefore, as a final moisture-proofing process, the molded condensers are impregnated with melted wax in a tank under vacuum, such as, for example, paraffin, cerease, halowax or any other suitable wax or waxes. Of course, a wax is chosen which will have a sufficiently high melting point to suit the requirements of the condenser for a particular purpose. If the condenser is to operate at a high temperature, a high melting point wax is used. The numeral 30 (Fig. 9) indicates this wax impregnation or coating. The condenser section prior to being enclosed in the porous housings may be impregnated partly or completely in wax as is usual in condenser manufacturing practice. However, complete impregnation may be accomplished as above outlined.

Figs. 10 and 11 show a flexible mold 20a in each of the cavities 21a of which there is provided a projection 35, adapted to contact the condenser section insert when placed therein. When the molding material is poured into the cavity 21a, and allowed to set, a perforation 36 (Fig. 12) is formed in the molded housing 37 reaching to the condenser section 22. There is thus provided a hole or similar opening through which may be forced by any suitable means a molten or a liquid dielectric, such as, an insulating oil. This oil will thoroughly penetrate and impregnate the elements of the condenser section as well as the molded porous housing enclosing the condenser section. The hole or opening 36 is then plugged up with any suitable means, such as, for example, a rubber plug, strip of adhesive, or plaster of Paris, and the molded condenser may be further treated as outlined hereinabove to make it moisture proof and gas proof.

Referring to Figs. 13–16, a transformer 50 is molded in a chemically setting casing 51 and the molded unit is impregnated with the varnish or other insulating agent 55 which seals the molded unit. Now, if desired, and after the varnish has set or dried, the entire molded unit may be impregnated with wax 56. The leads of the transformer windings are indicated by the numerals 52, 53 and 54.

From the foregoing description taken in connection with the accompanying drawing, it is apparent that improved simple, practical and inexpensive electrical devices for the purpose intended are provided. It is apparent, however, that immaterial changes and modifications may be made by skilled persons without departing from the true spirit and scope of the invention as outlined in the appended claims.

Having thus described our invention, what we claim as new and desire to secure by Letters Patent is:

1. As an article of manufacture, a cartridge comprising an electrical condenser unit, and a casing united to said unit, said casing being made of cold self-setting insulating material which sets hard within a period of substantially six hours, and heat-resistant, moisture-proof resistant material impregnating said casing.

2. In a condenser having an electrical unit, a casing bonded to said unit, said casing being made of cold self-setting insulating material which sets hard within a period of substantially six hours, and heat-resistant, moisture-resistant material impregnating said material.

PHILIP DUBILIER.
JACOB KATZMAN.

REFERENCES CITED

The following references are of record in the file of this patent:

UNITED STATES PATENTS

| Number | Name | Date |
|---|---|---|
| 1,274,380 | Brislin | Aug. 6, 1918 |
| 1,307,341 | Brinton | June 24, 1919 |
| 1,603,640 | Reed | Oct. 19, 1926 |
| 1,871,492 | Brennecke | Aug. 16, 1932 |
| 1,883,932 | Kazenmaier | Oct. 25, 1932 |
| 1,973,038 | Benedek | Sept. 11, 1934 |
| 1,973,039 | Benedek | Sept. 11, 1934 |
| 2,101,896 | Burlingame | Dec. 14, 1937 |
| 2,168,154 | Camilli | Aug. 1, 1939 |
| 2,207,707 | Baer | July 16, 1940 |

FOREIGN PATENTS

| Number | Country | Date |
|---|---|---|
| 502,039 | Great Britain | Mar. 9, 1939 |